United States Patent
Braun et al.

[11] 3,954,168
[45] May 4, 1976

[54] SINGLE CHAIN CONVEYOR

[75] Inventors: Ernst Braun; Gert Braun, both of Essen-Heisingen, Germany

[73] Assignee: Halbach & Braun, Germany

[22] Filed: Aug. 29, 1974

[21] Appl. No.: 501,814

[30] Foreign Application Priority Data

Sept. 7, 1973  Germany............................ 7332472

[52] U.S. Cl............................... 198/171; 198/189; 198/204
[51] Int. Cl.²......................................... B65G 19/00
[58] Field of Search ........... 198/171, 109, 189, 204, 198/176, 168; 59/63

[56] References Cited
UNITED STATES PATENTS

| | | | |
|---|---|---|---|
| 469,871 | 3/1892 | Salenius........................ | 198/168 UX |
| 1,375,060 | 4/1921 | Newdick............................ | 198/171 |
| 1,571,536 | 2/1926 | Wilson................................. | 198/171 |
| 1,917,134 | 7/1933 | Levin................................. | 198/204 X |
| 3,744,618 | 7/1973 | Monne................................. | 198/168 |

Primary Examiner—Robert J. Spar
Assistant Examiner—James M. Slattery
Attorney, Agent, or Firm—McGlew and Tuttle

[57] ABSTRACT

A chain conveyor, comprises a conveyor trough having a bottom and angled side guide wall surfaces. A link chain extends centrally along the trough, and it is supported above the bottom on a chain support which has a bottom face which is slidable along the bottom. A catch member is supported over the chain link on the chain support and it has arm portions extending laterally to each side of the chain with guide faces which are guided in the angled side guide walls of the trough. The chain support supports the catch member so that its bottom is spaced above the bottom of the trough.

2 Claims, 2 Drawing Figures

SINGLE CHAIN CONVEYOR

FIELD AND BACKGROUND OF THE INVENTION

This invention relates in general to the construction of chain conveyors and, in particular, to a new and useful single chain conveyor which includes a chain support supporting a link chain centrally in a trough and a catch member which overlies the link chain and has arms extending laterally on each side of the chain and guided in angled faces of the side walls of the trough.

DESCRIPTION OF THE PRIOR ART

Single chain conveyors are known and these are of various designs. Particularly known are conveyors of this type which comprise a conveyor trough with a chain running on the trough bottom and including catch blades which are secured to the chain by means of chain supports which are guided in lateral angle sections of the sides of the conveyor trough by means of guide shoes. Such single chain conveyors have proved satisfactory in principle particularly as far as their hauling capacity and service life is concerned. However, they are in need of improvement in other respects. Experience has shown that during a chain circulation in an empty conveyor, the catch blades moving on the trough bottom or trough sheet produce an annoying shrieking noise when they rub therealong. Such a shrieking noise is detrimental for the environment and provides a great deal of disturbance even in underground operations which are noisy in themselves.

SUMMARY OF THE INVENTION

In accordance with the present invention, there is provided an improved sngle chain conveyor constuction which is relatively silent in operation. The invention comprises a single chain conveyor with a single chain centrally arranged in a conveying trough and which carries catch members which are secured to the chain by means of chain supports and guided in lateral angle sections on the side walls of the conveyor by means of guide shoes. In accordance with the invention, in the zone of the trough bottom, the catch members rest only on the chain supports and these are designed as sliders for the catch members which have bottom surfaces which engage along the bottom of the trough and support the chain and the catch members so that the bottom surfaces of the catch members are above the bottom surfaces of the supports. The bottom web portions of the chain supports project downwardly by a small distance beyond the bottom surfaces of the catch members. Because of this inventive arrangement, the catch members or the bottom surfaces of the lateral arms of the catch members are guided along the trough bottom at a slight elevation above the bottom, thus preventing the production of shrieking noises. The invention is based on the experience that a small spacing between the bottom surfaces of the catch member arms and the trough bottom can be tolerated without any difficulty. Actually, the guidance of the catch members by means of their guide shoes in the area of their lateral angle sections is entirely sufficient to insure an unimpeded circulation of the catch members. This is also why, after a long period of service of the inventive single chain conveyor and a wear of the chain supports so their web portions which results therefrom, that a contact between the catch members or the bottom surfaces of the arms and the trough bottom is practically avoided. When the chain must be regularly replaced due to wear, all of the chain supports are also replaced, and all of the catch members are secured to the new chain by means of new supports. As a result, there is no tendency towards the generation of shrieking noises when the empty conveyor is circulated and this means that it is possible to provide a silently operable chain avoiding noise which would disturb the environment in which the personnel are working.

Accordingly, it is an object of the invention to provide a chain conveyor which includes a chain trough having side walls with guide faces which are engaged by lateral arms of catch members which are supported above a centrally arranged chain link on supports which are disposed with their bottom surface below the link and engage the bottom of the trough so as to hold the bottoms of the arms of the catch members above the bottom.

A further object of the invention is to provide a conveyor chain construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
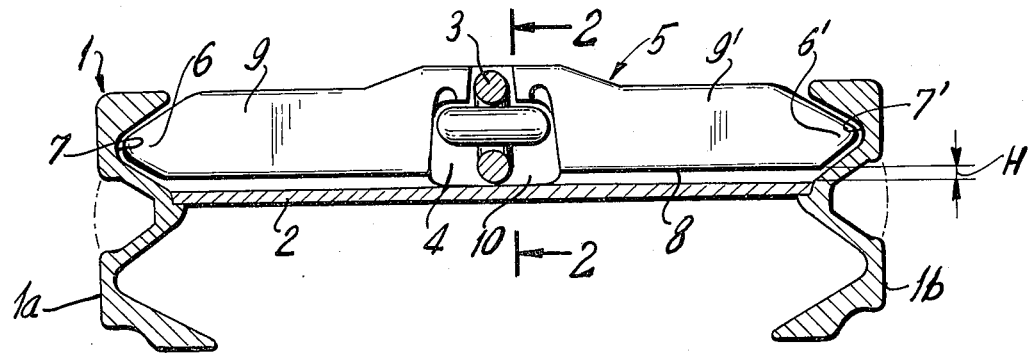
FIG. 1 is a vertical section of a single chain conveyor constructed in accordance with the invention.
Figure 2:
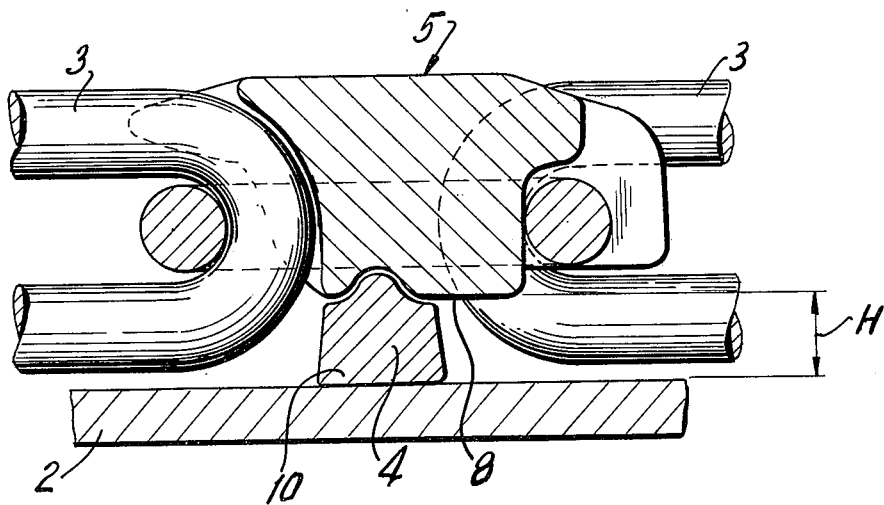
FIG. 2 is a transverse section of the chain shown in FIG. 1, taken along the line 2—2 of FIG. 1.

Referring to the drawing in particular, the invention embodied therein, comprises a single chain conveyor having a conveying trough, generally designated 1, with side walls 1a and 1b defining angled guide faces 7, 7'. Link chain 3 runs centrally along a trough bottom 2.

In accordance with the invention, the link chain carries catch members 5 which are secured to chain 3 by means of chain supports 4. Catch members 5 include lateral guide arms 9, 9' having end faces with guide shoes 6 and 6' which are guided in angled guide faces 7 and 7', respectively. In the zone of the trough bottom 2, catch members 5 are applied only against the chain supports 4. For this purpose, the chain supports are designed as sliders. The chain supports include web portions or bottoms 10 which project downwardly by a small distance H from the bottom surfaces 8 of the lateral guide arms 9 and 9' of the catch member 5. By this means, the guide arms 9 and 9' are supported so that they run above the bottom 2 by a distance H so that there is no tendency for them to produce a scraping noise along the bottom.

While a specific embodiment of the invention has been shown and described in detail to illustrate the application of the principles of the invention, it will be understood that the invention may be embodied otherwise without departing from such principles.

What is claimed is:

1. A chain conveyor comprising a conveyor trough having a bottom and angled side guide walls, a link chain extending centrally along said trough, a chain support having a lateral guide face on each side and having a width between said side walls substantially equal to a link of said chain and having a bottom face slidable along said bottom, and an integral catch member having a recessed central portion engaged on said chain support and overlying said link chain and supported on said chain support and having arm portions extending laterally to each side of said chain and said chain support and having inner ends engaged on respective guide faces of said chain support, said arm portions having outer ends with lateral guide faces guided on said angled side guide walls of said conveyor trough and having bottom surfaces supported above said bottom of said trough and the bottom face of said chain support.

2. A chain conveyor according to claim 1, wherein said chain support has a top recess for accommodating a horizontally disposed and vertically disposed link of said link chain, said integral catch member being engaged over the horizontal link and having a flap for receiving the vertical link in the recessed central portion.

* * * * *